(12) United States Patent
Yamamoto

(10) Patent No.: US 6,533,652 B2
(45) Date of Patent: Mar. 18, 2003

(54) CONTINUOUS ROE SEPARATING APPARATUS

(75) Inventor: Takumi Yamamoto, Hokkaido (JP)

(73) Assignee: Taiyo Seisakusho Co., Ltd., Hokkaido (JP)

( * ) Notice: Subject to any disclaimer, the term of this patent is extended or adjusted under 35 U.S.C. 154(b) by 0 days.

(21) Appl. No.: 09/983,376

(22) Filed: Oct. 24, 2001

(65) Prior Publication Data

US 2002/0049035 A1 Apr. 25, 2002

(30) Foreign Application Priority Data

Oct. 24, 2000 (JP) .................................. 2000-324580

(51) Int. Cl.⁷ ............................................. A22C 21/06
(52) U.S. Cl. ...................................................... 452/110
(58) Field of Search ................................ 452/110, 121, 452/119, 120, 161, 173, 123, 7

(56) References Cited

U.S. PATENT DOCUMENTS

| 1,721,281 | A | * | 7/1929 | Reid | |
| 3,793,676 | A | * | 2/1974 | Wiggins | 452/110 |
| 5,207,610 | A | * | 5/1993 | Ogawa | 452/110 |
| 6,303,027 | B1 | * | 10/2001 | Sato et al. | 452/110 |
| 6,347,986 | B1 | * | 2/2002 | Fujii | 452/135 |

FOREIGN PATENT DOCUMENTS

| CH | 597763 | * | 4/1978 |
| JP | 1-257425 | * | 10/1989 |
| JP | 9065859 | | 3/1997 |
| JP | 2000157223 | | 6/2000 |
| SU | 1242093 | * | 6/1986 |

* cited by examiner

*Primary Examiner*—Peter M. Poon
*Assistant Examiner*—David Parsley
(74) *Attorney, Agent, or Firm*—Jacobson Holman PLLC

(57) ABSTRACT

A continuous roe separating apparatus includes a cylindrical rotary net which has a roe carrying surface formed into a meshed peripheral surface and which is disposed such that its cylindrical axial center is horizontal and which is rotatable around its axial center. A squeezing roller is placed facing the peripheral surface in the same axial direction as the rotary net and adapted to press the roes carried in the rotational direction of the rotary net from above between the roller and the peripheral surface to squeeze out the roe particles from an ovary membrane and to drop or droop the roe particles through the roe particles dropping holes of the peripheral surface into the rotary net. A roe particles scraper is provided for scraping the roe particles pressed by the squeezing roller to be drooped through the drop holes into the rotary net.

8 Claims, 14 Drawing Sheets

CONTINUOUS ROE SEPARATING APPARATUS

BACKGROUND OF THE INVENTION

1. Field of the Invention

The present invention relates to a continuous roe separating apparatus for separating a number of roe particles enveloped in an ovary membrane from this membrane.

In this specification, the roe particles enveloped in the ovary membrane are typically salmon roes, in which a number of eggs of, e.g., salmon and trout, are enveloped in the ovary membrane. However, it is to be noted that a number of any roe particles enveloped in the ovary membrane are within the scope of the present invention.

2. Description of the Related Art

Conventionally, the separation/removal of a number of roe particles (salmon roes) from roes of, e.g., a salmon has generally been carried out by placing, on a flat net, salmon roes whose ovary membrane is partially opened, and then crumpling the roes with hands by a worker.

Such a hand-crumpling work by the worker himself requires a high skill. Therefore, because of the limited number of workers for this hand-crumpling work, a fatigue level of the full-time worker is considerable. In addition, the worker wears cotton work gloves to prevent slippage, but such roes are very oily, and the oil entering through spaces or the like of the cotton work gloves causes the hands to become rough. This problem has been the most serious worry for the worker.

Such a hand work, moreover, has not been compliant with Hazard Analysis Critical Control Point (HACCP) for hygiene management.

Furthermore, if rubber gloves are used in place of the cotton work gloves, the oil may be prevented from directly touching worker's hands. However, the manual operation is still employed, which is undesirable from the viewpoint of the sanitation. In addition, there is recently a problem that environmental hormones have been detected from the gloves made of vinyl chloride resins. Thus, such a separation work by hand has not been desirable for HACCP on the food hygiene.

Accordingly, in order to solve the problems of the roe separating work by such a manual operation, the following continuous roe separating apparatus has been provided.

That is to say, this continuous roe separating apparatus comprises a net on which roes with an ovary membrane are put and which is adapted to be moved back and forth in a horizontal direction, a pressing device for pressing the roes with the ovary membrane from the upper surface of the net, and a roe particles scraper portion located below the net so as to be moved in a direction opposite to the moving direction of the net.

The above conventional apparatus is constructed in such a manner that the roes with the ovary membrane are first placed on the net formed into a roughly rectangular shape when seen from the plane, and then the pressing device is lowered from the above to press the roes are pressed against the net with a desired pressure. Afterward, when the net is moved back and forth by a driving source, the roes with the ovary membrane pressed from the above to the net by the pressing device are massaged, so that the roe particles drop from the meshes of the net. The lined roe particles are drooped from the meshes, and the scraper portion which is moved in the direction opposite to the net cuts the line under the net to drop the roe particles.

However, in the above structure and operation, the following points have remained to be improved.

(1) The separation work of the next roes with an ovary membrane cannot be started before the completion of the separation work of the roes with the ovary membrane set by one work. Consequently, the loss of working hours is great, making it impossible to achieve mass production.

(2) The pressing device must be moved up and down for operation for each work. Consequently, much time and labor are required, causing a loss of working hours.

(3) The work must be interrupted to raise the pressing device in order to confirm the clear separation and dropping of the roes from the ovary membrane. Consequently, useless labor is generated, and the work must be interrupted each time, causing a great loss of working hours.

The inventors conducted earnest and serious studies over and over and, as a result, succeeded in the development of an apparatus hereby specified, which is capable of performing continuous separation work of roe particles without troubling worker's hands.

The invention was made to solve the foregoing problems inherent in the conventional art, and it is an object of the invention to provide a continuous roe separating apparatus capable of continuous work, suitable for mass production, and capable of easily and surely carrying out the work of separating roe particles without troubling worker's hands. Other objects are to facilitate washing, and to save space while achieving the above object.

SUMMARY OF THE INVENTION

In order to achieve the above object, a first aspect of the present invention is directed to a continuous roe separating apparatus comprising at least a cylindrical rotary net in which a carrying surface on which roes with an ovary membrane having one opened surface are mounted is a peripheral surface formed in a meshed shape, and a cylindrical axial center is horizontally arranged so that the cylindrical rotary net may be rotated around the axial center; a squeezing roller which is placed facing to the peripheral surface in the same axial direction as the rotary net and which presses the roes carried in a rotational direction of the rotary net from the above between the roller and the peripheral surface to squeeze out roe particles from the ovary membrane and to drop or droop the roe particles through roe particles dropping holes of the peripheral surface into the rotary net; and a roe particles scraper portion for scraping and dropping the roe particles pressed by the squeezing roller and drooped through the drop holes into the rotary net.

A second aspect of the present invention is directed to a continuous roe separating apparatus in which the cylindrical rotary net is cylindrically constituted of a cylindrical peripheral surface wholly formed in a meshed shape, and left and right side faces disposed on both sides of the peripheral surface; each of the side faces is formed to have a diameter larger than the peripheral surface, and provided with a guiding piece projected in a diameter direction; and each guiding piece is adapted to be rotated by a driving source, and held to enable the transmission of rotational motion by rotation transmission rollers on at least front and back as well as left and right sides disposed on a lower side of the rotary net, whereby the rotary net is held rotatably and upward detachably on the rollers.

A third aspect of the present invention is directed to a continuous roe separating apparatus in which the squeezing roller comprises a group of rollers placed facing to the peripheral surface in the same axial direction as the peripheral surface of the rotary net and arranged side by side in a carrying direction; the respective rollers constituting the roller group are adapted to be rotated in a direction opposite to that of the rotary net; and a gap between the peripheral surface of each roller and the peripheral surface of the rotary net is gradually narrowed from an upstream side roller to a downstream side roller.

A fourth aspect of the present invention is directed to a continuous roe separating apparatus in which the squeezing roller is adapted to be moved away from the upper side of the rotary net to the outside of a rotational range of the rotary net.

DESCRIPTION OF THE PREFERRED EMBODIMENTS

Figure 1:
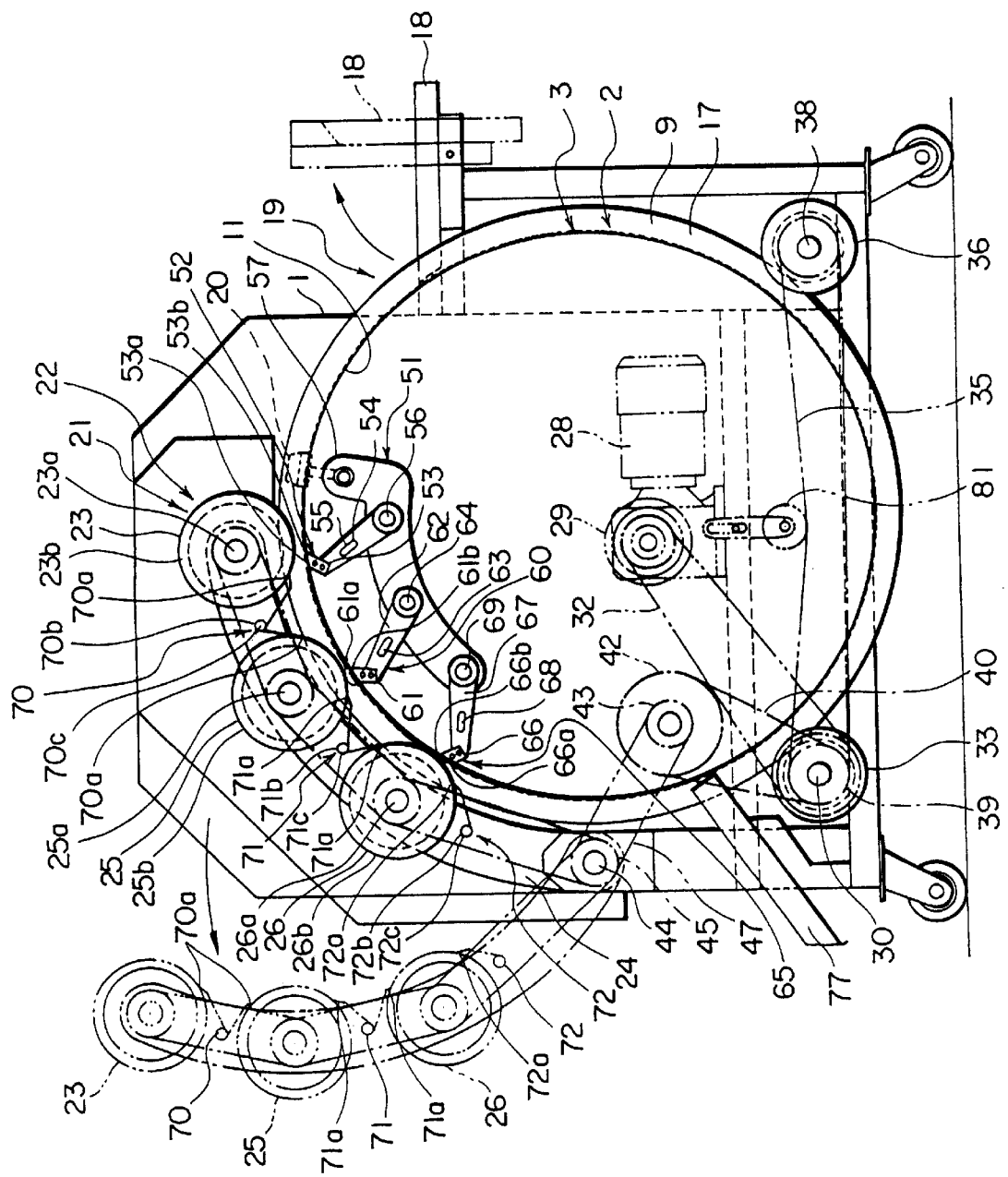
FIG. 1 is a vertical section side view showing an embodiment of the invention in a partially omitted manner.
Figure 2:
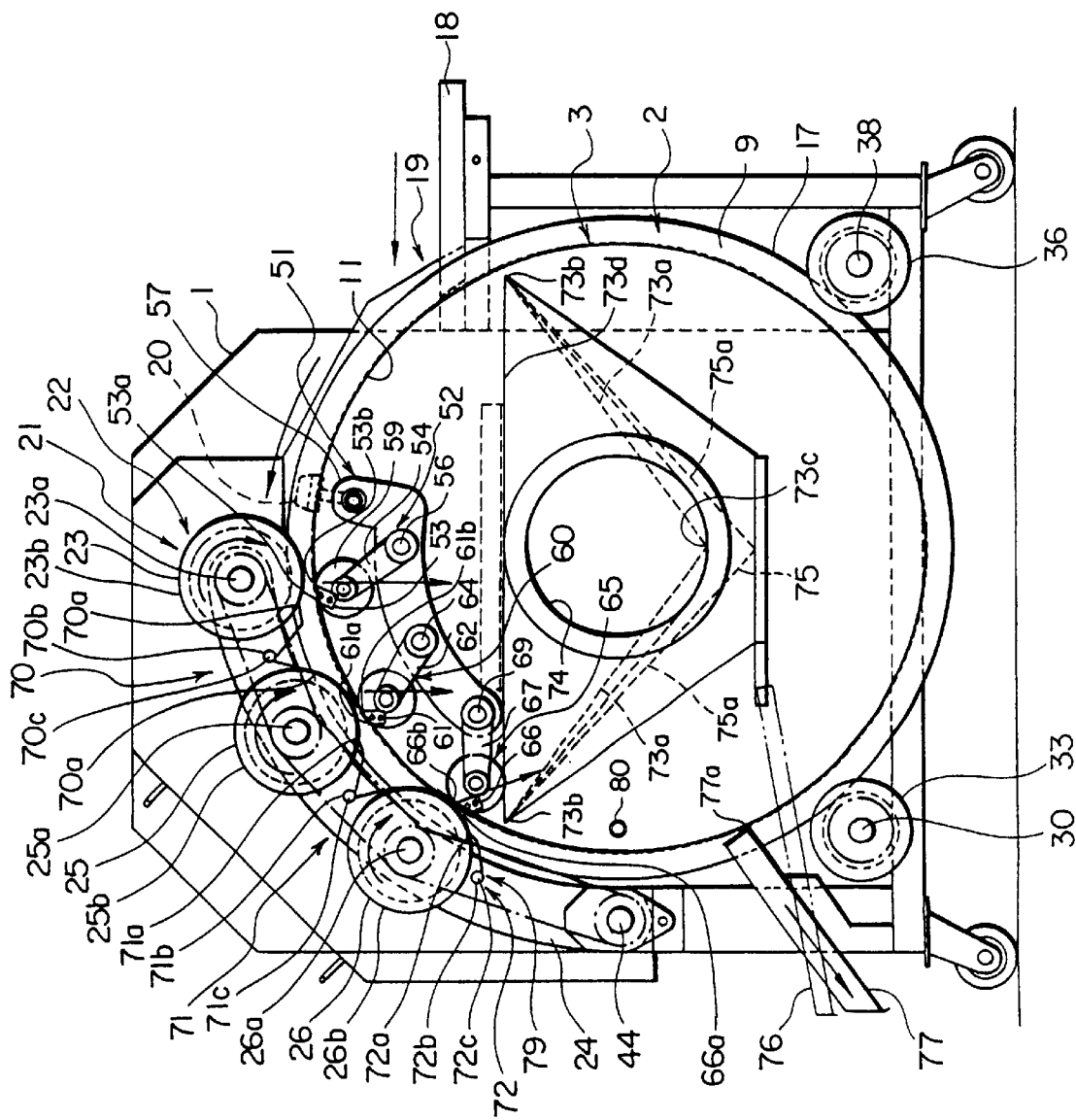
FIG. 2 is a vertical section side view showing the embodiment of the invention in a partially omitted manner.
Figure 3:
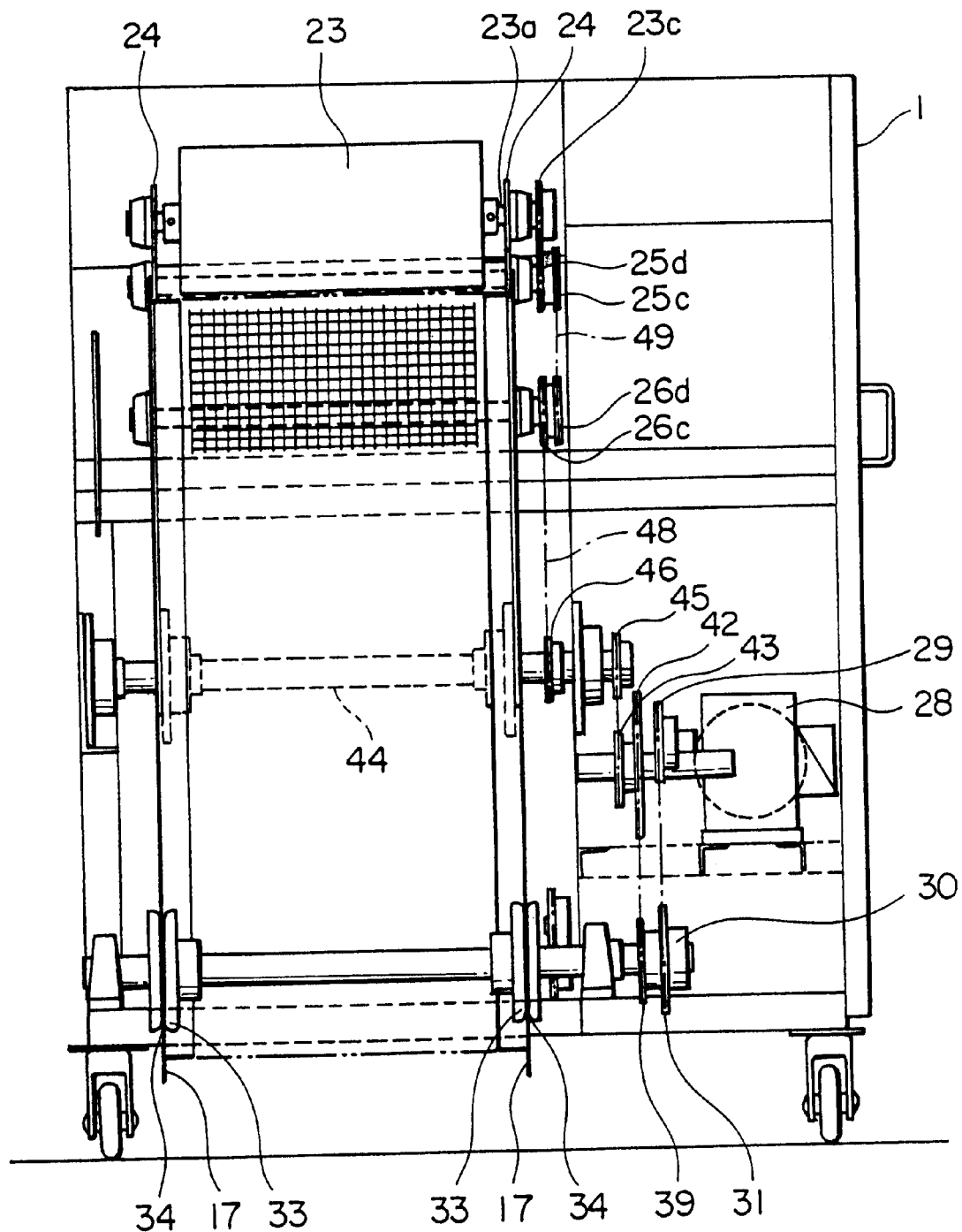
FIG. 3 is a front view with partial omission.
Figure 4:
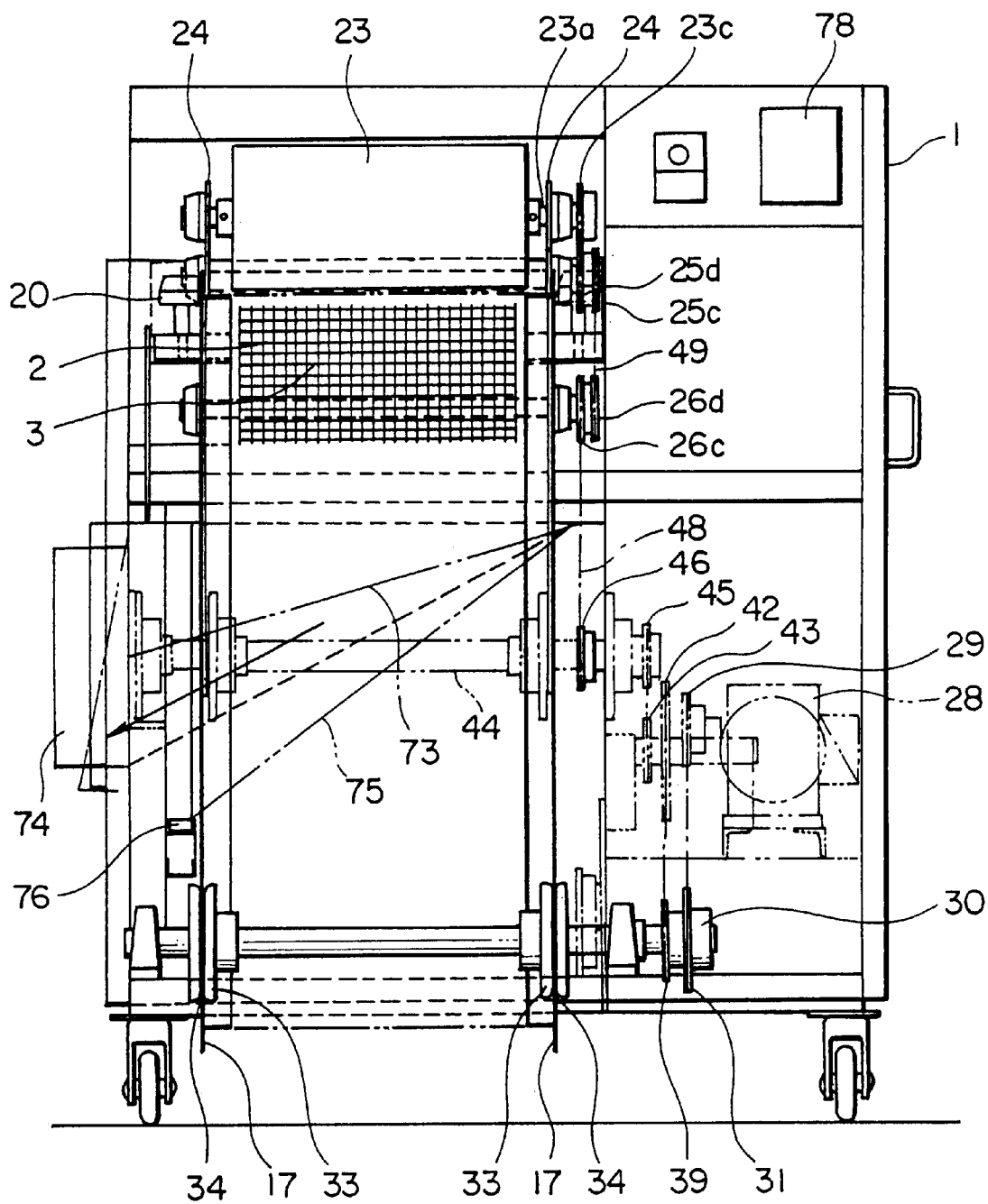
FIG. 4 is a front view with partial omission.
Figure 5:
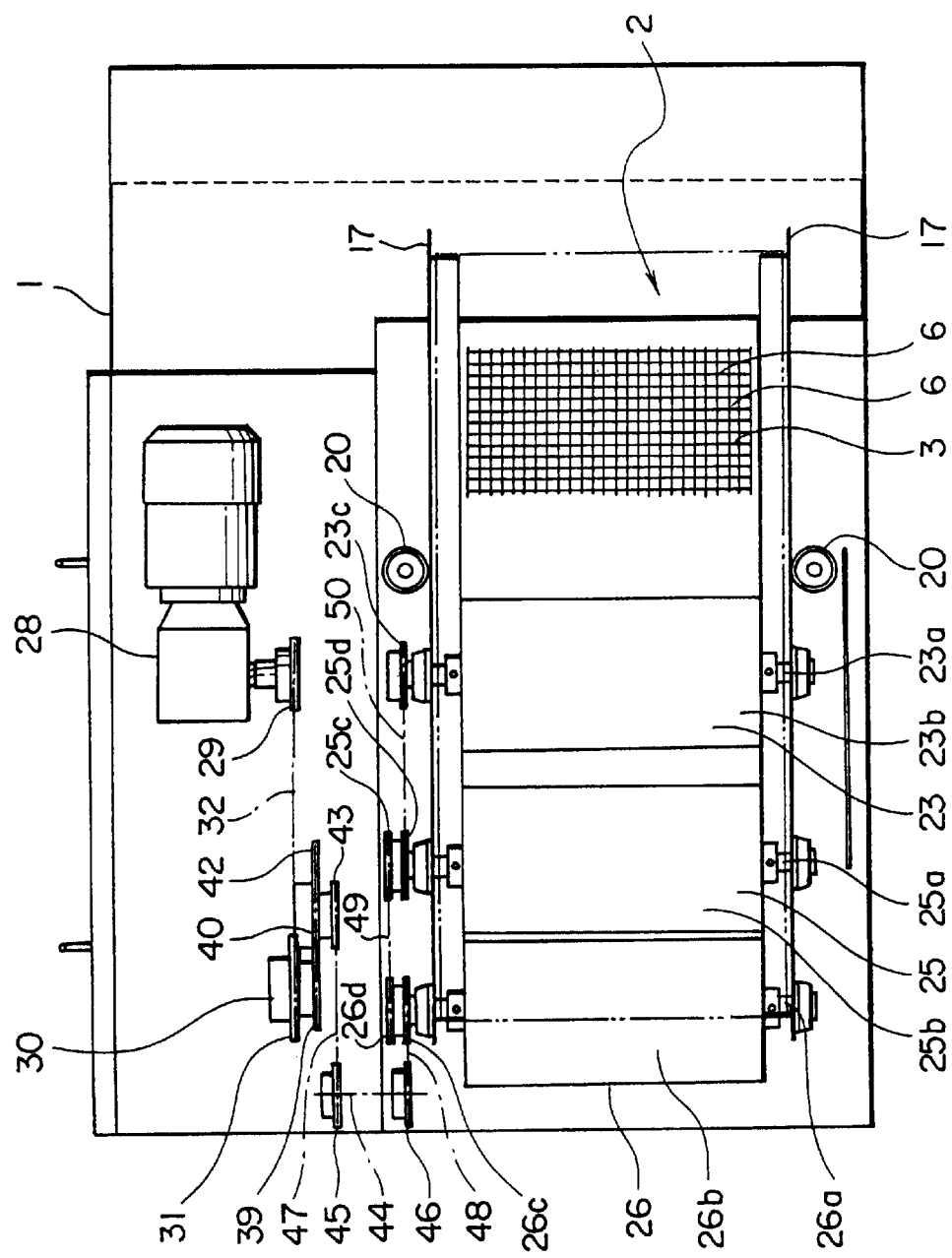
FIG. 5 is a plan view with partial omission.
Figure 6:
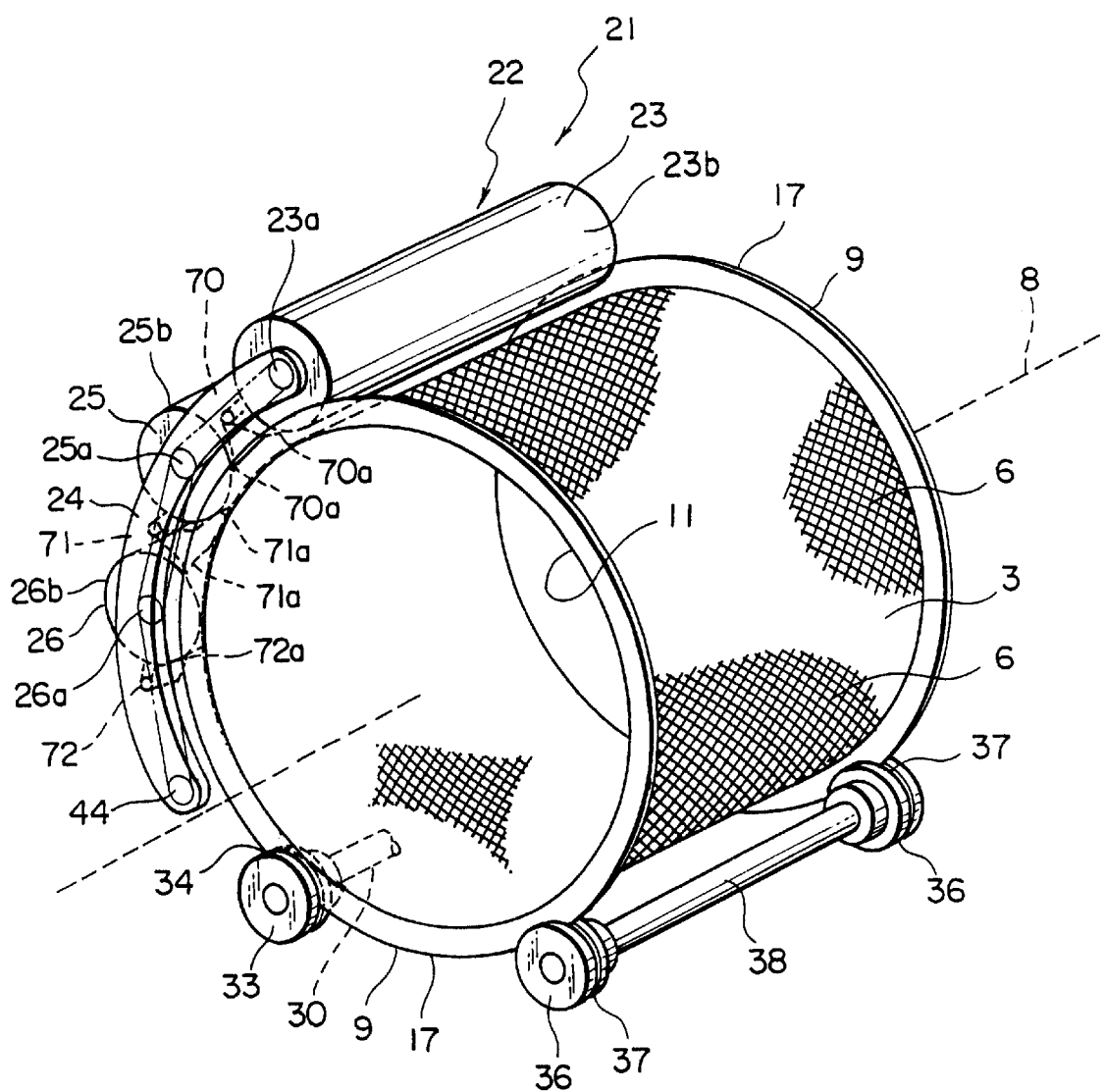
FIG. 6 is a perspective view showing main portions.
Figure 7:
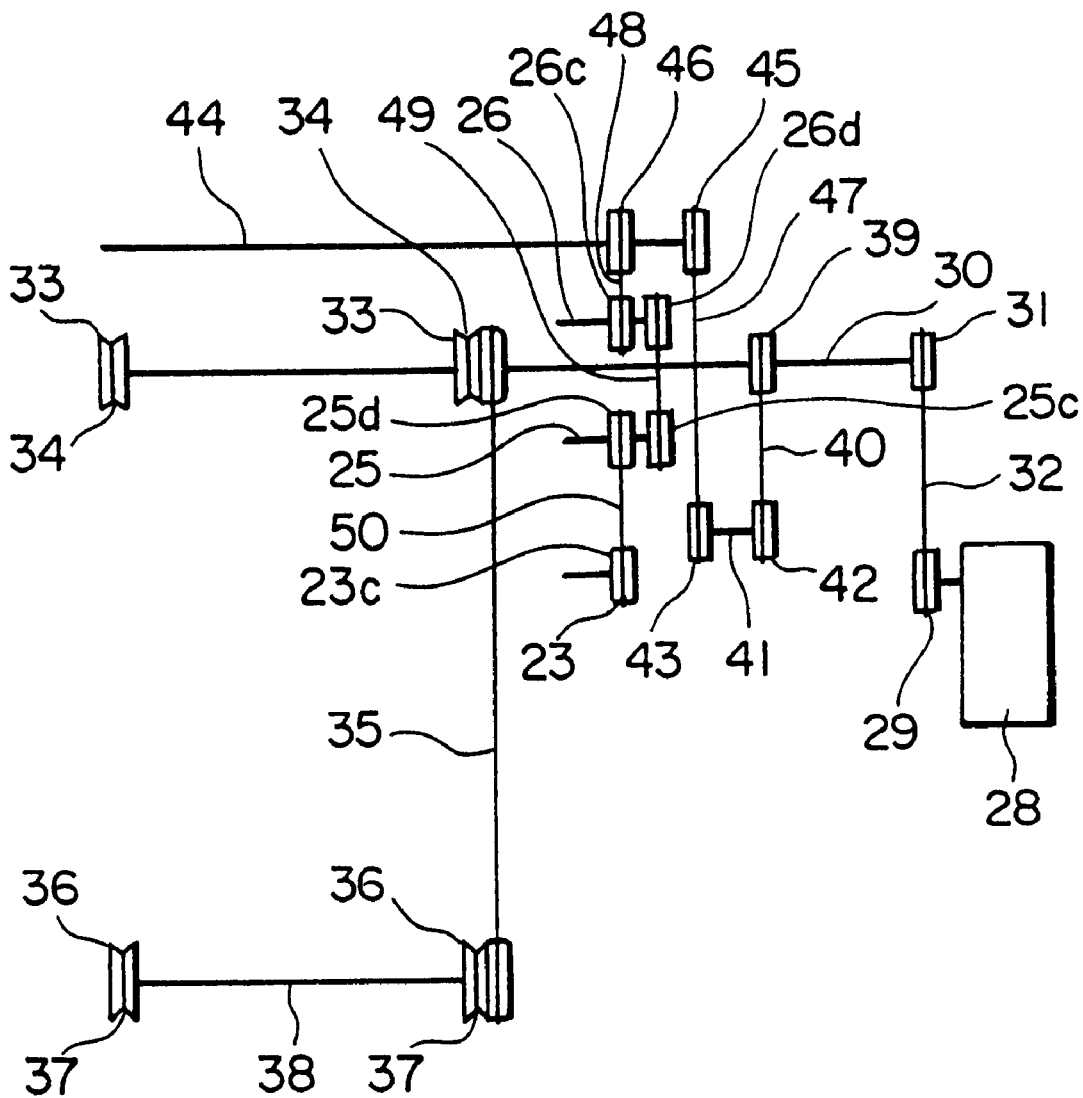
FIG. 7 is a schematic view showing a driving mechanism according to an embodiment of the invention.
Figure 8:
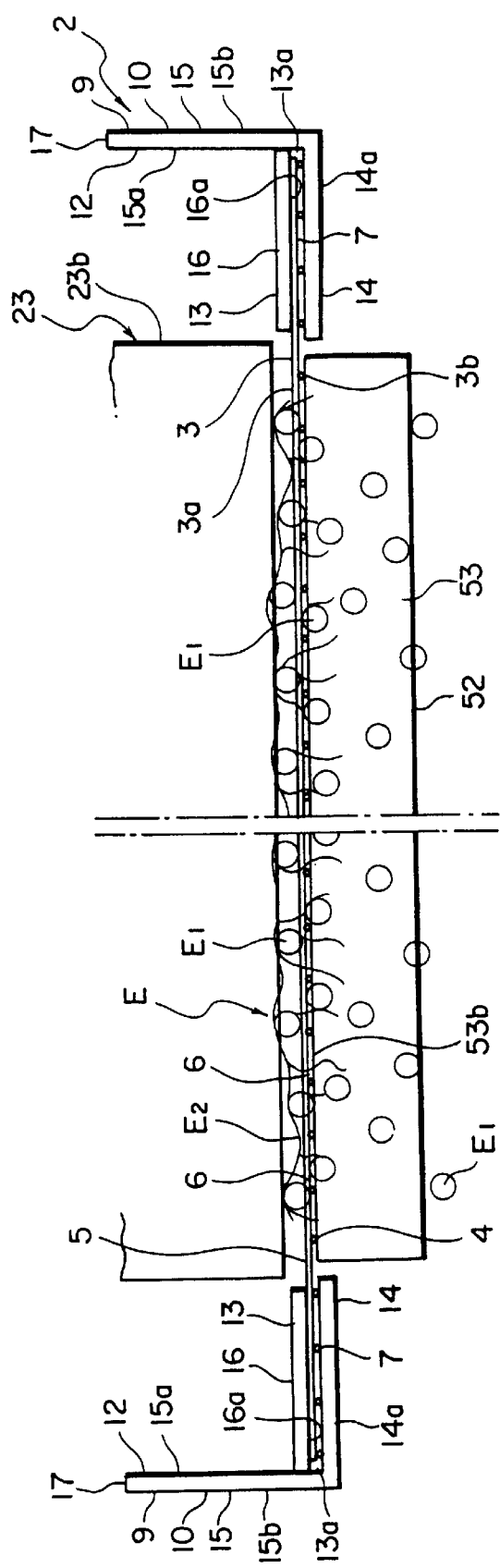
FIG. 8 is a vertical section front view partially showing a roe particles scraping state.

Next, description will be made of the preferred embodiments of the continuous roe separating apparatus of the present invention with reference to the accompanying drawings. The drawings show an embodiment of the invention, there is no limitation placed on shapes and forms shown, and changes and modifications can be made in shapes and structures with in the scope of the invention.

In the drawings, a reference numeral 1 denotes an apparatus casing; 2 a rotary net; 21 a squeezing roller; 51 a roe particles scraper portion; 28 a driving source; 78 a control unit; E a roe with an ovary membrane; $E_1$ roe particles; $E_2$ an ovary membrane; and $E_3$ a line.

The apparatus casing 1 is formed in a desired shape by considering the configuration of each of the housed components, such as the rotary net, and the squeezing roller 21. That is to say, the apparatus casing 1 is in no way limited to the configuration shown, and changes can freely be made within the scope of the invention.

The rotary net 2 is composed of a peripheral surface 3 formed in a meshed shape, and left and right side faces 9 and 9 provided in both sides of the peripheral surface 3, and formed in a cylindrical shape having a desired diameter and a desired axial direction length. The peripheral surface 3 is formed as a carrying surface.

The peripheral surface 3 (or carrying surface) is, for example, in the embodiment, formed and welded to a meshed plate having a number of roe particles dropping holes (meshed portion) of uniform hole diameters, in which vertical and horizontal wires 4 and 5 made of stainless steel wires of desired wire diameters are regularly combined vertically and horizontally. This peripheral surface 3 then forms an overall meshed and welded rotary net wound in a cylindrical shape of a desired cylindrical diameter, and opened in both sides.

There should be no particular limitation placed on the interpretation of the roe particles dropping holes 6 of the peripheral surface 3, and it is only necessary to have diameters, through which roe particles $E_1$ separated from the ovary membrane $E_2$ can be dropped. Hole diameters may be uniform or nonuniform, the number of holes can be optionally set, and the arraying of the holes may be uniform or nonuniform in a peripheral/axial direction.

The peripheral surface 3 may be formed in such a manner that a stainless steel plate having a desired number of roe particles dropping holes of desired diameters is wound in a cylindrical shape by pressing machining or the like. As long as a number of roe particles dropping holes are provided in the cylindrical peripheral surface, any manufacturing methods and materials can be used, which are all within the scope of the invention. The rotary net 2 should not be limited to the foregoing cylindrical shape, and a polygonal cylindrical shape having a plurality of narrow flat surfaces provided side by side in the peripheral direction may even be used, which is also within the scope of the invention.

The left and right side faces 9 and 9 are formed to be larger in diameter than the cylindrical body of the peripheral surface 3. In the inner surface 12 of the ring-shaped main body 10 of a desired thickness having an opening in the center, fitting flange portions 13 and 13 roughly U shaped in section are provided around to fit the peripheral edges 7 and 7 of the cylindrical body of the peripheral surface 3, and portions located more upward in a diameter direction than the flange portions 13 and 13 are set as guiding pieces 17 and 17.

That is to say, according to the embodiment, in the vertical inner surface 15a of the ring-shaped main body lo composed of horizontal and vertical surfaces 14 and 15, a ring member 16 having an inner diameter 16a larger than the horizontal surface inner diameter 14a of the main body 10 is secured to form a desired fitting gap 13a with the outer surface 15b of the vertical surface, and thereby the fitting flange portion 13 roughly U shaped in section is formed.

The fitting flange portion 13 is provided integrally in the inner surface 12 of the ring-shaped main body 10, but it is in no way limited to such constitution. A ring member roughly U shaped in section may be separately secured to a desired place in the inner surface of the ring main body.

In the embodiment, the peripheral surface 3 of the rotary net 2 is integrally fitted and fixed through the fitting flange portions 13 and 13 provided in the left and right side faces 9 and 9. The installing of the fitting flange portions 13 and 13 in the left and right side faces 9 and 9 is optional, and thus no particular limitation is placed in this regard. For example, the peripheral surface 3 of the rotary net 2 and the inner surfaces 12 and 12 of the left and right side faces 9 and 9 may be optionally secured together to be integral, which is within the scope of the invention.

A protruding shape and a thickness are optionally set for the guiding piece 17, as long as it is fitted and held by a plurality of rotational motion transmission rollers 33, 33, 36 and 36 for transmitting rotational motion from the driving source 28 to the rotary net 2, and enables rotational motion to be transmitted.

The cylindrical axial center 8 is horizontal, and the rotary net 2 is arranged in the apparatus casing 1 so as 40 to be rotated around the axial center 8. The transmission of rotary motion to the rotary net 2 is carried out by at least the rotational motion transmission rollers 33, 33, 36 and 36 of the front and back and left and right sides disposed in the lower side of the rotary net 2 outside the cylinder.

That is to say, the rotary net 2 has no rotary shafts provided in the cylindrical axial center 8, and only fits and holds the guiding pieces 17 and 17 of the rotary net 2 by the rotational motion transmission rollers 33, 33, 36 and 36 disposed outside the cylinder. The rotary net 2 is held on the rollers 33, 33, 36 and 36 so as to be rotated and detached upward.

The left and right side faces 9 and 9 are in no way limited to the formation of the embodiment, and various changes can be made within the scope of the invention. If a structure is employed, in which the guiding pieces 17 and 17 are directly provided in the left and right edges of the peripheral surface 3, it is not necessary to provide such left and right side faces 9 and 9.

In the drawings, a reference numeral 19 denotes is a roe inlet for throwing the roes E with the ovary membrane from a stocker 18 into the peripheral surface 3 of the rotary net 2. According to the invention, the stocker 18 is not an essential component. It is provided for improving work efficiency, and there is no limitation placed in the structure thereof.

According to the embodiment, the apparatus casing 1 includes rolling prevention pulleys 20 and 20 provided in the upper side of the rotary net 2 oppositely to the outside of the left and right side faces 9 and 9 (outer surface of the guiding pieces 17 and 17). The rolling of the rotary net 2 is prevented by bringing the pulleys 20 and 20 respectively into the outer surfaces of the guiding pieces 17 and 17. In the embodiment, the rolling prevention pulleys 20 are provided, one each, in the left and right sides. However, the number of arranged pulleys and shapes can be set optionally without any limitations.

The squeezing roller 21 is a cylindrical roller having an axial direction length roughly equal to that of the peripheral surface 3 of the rotary net 2, and formed to have a desired diameter. One or a plurality of such rollers are provided oppositely to the peripheral surface 3 of the rotary net 2 in the same axial direction as that for the rotary net 2 by keeping desired gaps C1, C2, and so on, with the peripheral surface 3 or so as to be brought into light contact with the same. Each roller is designed to press the roes E with the ovary membrane carried in the rotational direction of the rotary net 2 from the above with the peripheral surface 3, squeeze out roe particles E1 from the ovary membrane E2, and drop/droop the roe particles through the roe particles dropping holes 6 of the peripheral surface 3 into the rotary net 2.

In addition, the squeezing roller 21 is adapted to be moved in a direction opposite the rotational direction of the rotary net 2 by the driving source 28. Here, the number of squeezing rollers 21 is selected to be one or a plurality, but no limitation is placed in this regard.

In the embodiment, the squeezing roller 21 faces the peripheral surface 3 of the rotary net 2 in the same axial direction, a roller group 22 is provided, i.e., a plurality of rollers, first, second and third squeezing rollers 23, 25 and 26 being provided side by side in the carrying direction, each roller of the roller group 22 is rotatable in a direction opposite the rotary net 2 and, from the first squeezing roller 23 of the upstream side to the third squeezing roller 26 of the downstream side, a space between the peripheral surface of each roller and the peripheral roller 3 of the rotary net 2 is gradually narrowed. In the embodiment, the third squeezing roller 26 is in light contact with the peripheral surface 3.

In addition, according to the embodiment, roller main bodies 23b, 25b and 26b are made of independent foam sponges having proper hardness. Since each roller main body is made of such a material, soft pressing is possible, and roe particles $E_1$ can be squeezed out without being damaged. There is no particular limitation placed in the constitution.

A gap C1 or C2 formed between each of the rollers 23, 25 and 26, and the outer surface 3a of the peripheral surface is in no way limited, but a width should preferably be set so as to enable roe particles E to be pressed with the outer surface 3a of the peripheral surface.

In the drawings, reference numerals 23a, 25a and 26a denote the shafts of the rollers 23, 25, and 26; 23b, 25b and 26b cylindrical roller main bodies provided in the outer peripheries of the shafts 23a, 25a and 26a; 23c, 25c and 26c pulleys provided in the shafts 23a, 25a and 26a to link bands 48, 49 and 50; and 24 a shaft fixing bracket for holding the shafts 23a, 25a and 26a of the rollers 23, 25 and 26 rotatably.

No limitation is placed on the foregoing constitution and, for example, cylindrical diameters and materials for the roller main bodies 23b, 25b and 26b can be selected within the scope of the invention as occasion demands.

In addition, no particular limitation is placed on the interval of arranging the rollers 23, 25 and 26, and a most effective interval is properly set in consideration of the roller diameters and the diameter or the like of the rotary net 2.

The shaft fixing bracket 24 is formed to be reversed such that only its lower end side can be supported by a squeezing roller drive shaft 44, and moved away from the upper side of the rotary net 2 to the outside of the rotational range of the rotary net 2 with the shaft 44 as a fulcrum.

The shaft fixing bracket 24 is formed, for holding the rollers 23, 25 and 26, in a desired circular arc shape when seen from the side, in order to form preset desired gaps C1, C2, and so on, between the rollers 23, 25 and 26 and the outer surface 3a of the peripheral surface of the rotary net 2. If the arrangement enables gaps set between the rollers 23, 25 and 26 and the outer surface 3a of the peripheral surface, the formation of a circular arm shape when seen from the side is not particularly necessary, and any optional shape can be selected within the scope of the invention.

The roller group 22 may have a well-known fixing and holding structure such that it can be always held in a fixed position on the rotary net except during reversing.

In the embodiment, the rollers 23, 25, and 26 are formed in cylindrical shapes having equal diameters, equal diameter direction widths, and equal axial direction lengths. However, diameters and diameter direction widths may be set different, each roller may be composed of a plurality of rollers combined side by side, and each roller main body may be formed in a polygonal cylindrical shape, in which a number of thin width flat surfaces are combined in the peripheral direction. These arrangements are all within the scope of the invention.

Further, in order to increase the separation effect of roe particles $E_1$, preferably, a driving mechanism is employed for rotating the rollers 23, 25 and 26, and at the same time reciprocating the same in the axial direction. In other words, the separation of roe particles $E_1$ from the ovary membrane $E_2$ is greatly improved by not only pressing roe particles E1 from the above by desired pressure but also applying a swinging operation simultaneously with the application of such a pressing operation. For the driving mechanism for offering such an operation, a well-known technology is employed within the scope of the invention.

As an example, the first embodiment will be described with reference to FIGS. 15 to 18. There are no particular limitations on the interpretation of the embodiment of a swinging mechanism explained hereinbelow, and other structures can be optionally selected within the scope of the present invention.

According to the embodiment, two rollers, i.e., first and second squeezing rollers 23 and 25, are respectively provided with swinging mechanisms 82 and 82.

Each swinging mechanism 82 includes: a disk cam 83 provided in one side face 23e (25e) of a roller main body 23b (25b); an elastic member (spring) 87 provided in the other side face 23f (25f) of the roller main body 23b (25b) for always pressing the roller main body 23b (25b) in an axial direction; a bearing unit 88 for rotatably supporting a follower roller 92 brought into contact with the side face 84 in a position opposite the side face 84 of the disk cam 83.

The disk cam 83 has one side face 86 integrally attached coaxially to the side face 23e (25e) of the roller main body 23b (25b), and a cam sliding surface 85 formed to be continuous in a peripheral direction in the other side face 84 brought into contact with the follower roller peripheral surface 93 of the bearing unit 88. The cam sliding surface 85 may be a groove.

According to the embodiment, the cam sliding surface 85 is constructed in such a manner that a slope having high level and low level positions 85a and 85b opposed to each other is formed to be continuous in the peripheral direction, and the roller main body 23b (25b) is axially reciprocated during one rotation.

In addition, according to the embodiment, shafts 23a and 25a for respectively transmitting rotations to the first and second squeezing rollers 23 and 25 are spline shafts. On the other hand, spline nuts 95-95, and 95-95 attached coaxially to the shaft insertion holes of the respective roller main bodies 23b and 25b are provided in the respective side faces 23e–23f, and 25e–25f of the roller main bodies 23b and 25b. The spline shafts 23a and 25a are engaged with the spline nuts 95-95, and 95-95, and the roller main bodies 23b and 25b are constructed so as to be rotated and moved left and right in the axial direction.

In place of the disk cam 83, a constitution can be employed, where a so-called swash plate having the opposing surfaces of the follower roller 92 formed to be inclined and flat is attached to the side faces of the roller main bodies 23b and 25b.

The bearing unit 88 is constructed in such a manner that the follower roller 92 is supported so as to be rotated in a horizontal direction in the inner surface of a support plate 89 attached to a shaft fixing bracket 24, and the peripheral surface 93 of the roller 92 is slid into contact with the cam sliding surface 85 formed in the side face 84 of the opposing disk cam 83. Thus, the follower roller 92 has its peripheral surface slid into contact with the cam sliding surface 85 in a predetermined position.

The bearing unit 88 is fitted in a vertical oblong hole 90 provided in the support plate 89 by a bolt 91 so as to be adjusted for up-and-down movement.

The elastic member 87 is disposed to always press the roller main body 23b (25b) in the axial direction over the side face 23f (25f) of the roller main body 23b (25b) and an elastic member receiver 87a provided in the outer surface of the shaft 23a (25a).

In the embodiment, for the elastic member 87, a coil-like spring provided through the shaft 23a (25a) is used. However, there are no particular limitations in this regard, and for example a leaf spring or a synthetic resin piece having desired elasticity may be used, which is within the scope of the present invention.

According to the embodiment, the first and second squeezing rollers 23 and 25 are constructed so as to be swung left and right alternately in the axial direction.

For example, high level positions 85a and 85a in the respective cam sliding surfaces 85 of the disk cams 83 attached to the first and second squeezing rollers 23 and 25 are shifted by 180° during device assembling.

Figure 15:
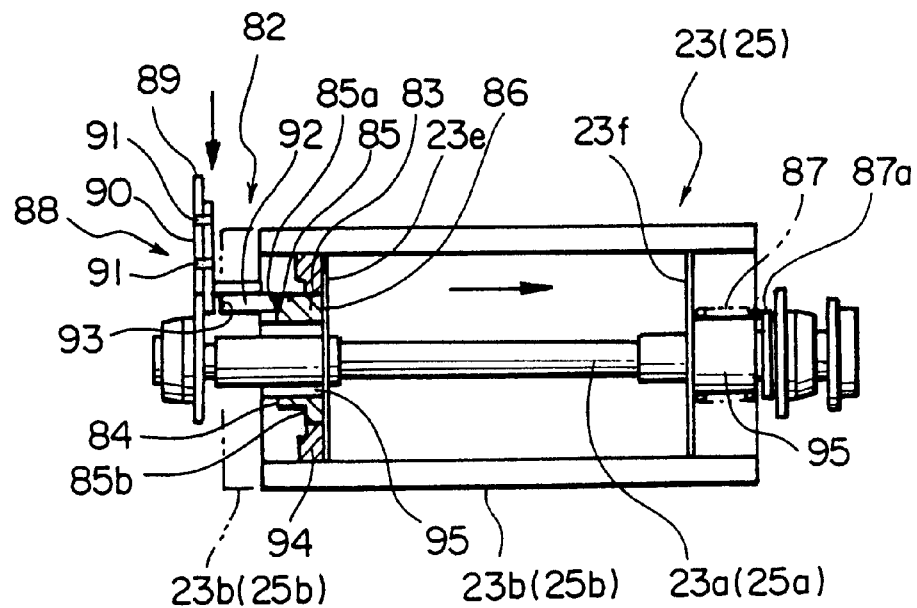
FIG. 15 is a sectional view showing a swinging mechanism of an embodiment.
Figure 16:
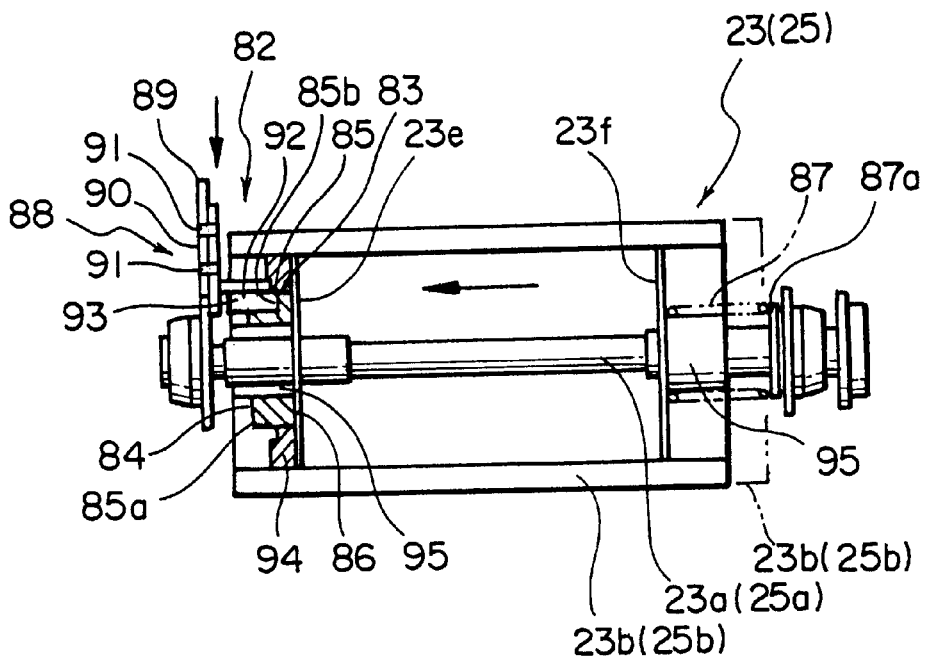
FIG. 16 is a sectional view showing the swinging mechanism of the embodiment.

Specifically, the first squeezing roller 23 is attached to be set in a state shown in FIG. 15 (state where the high level position 85a is positioned in the upper part of the drawing and in contact with the follower roller 92); and the second squeezing roller 25 in a state shown in FIG. 16 (state where the high level position 85a is positioned in the upper part of the drawing, and the follower roller 92 is in contact with the lower level position 85b positioned in the upper part of the drawing).

Figure 18:
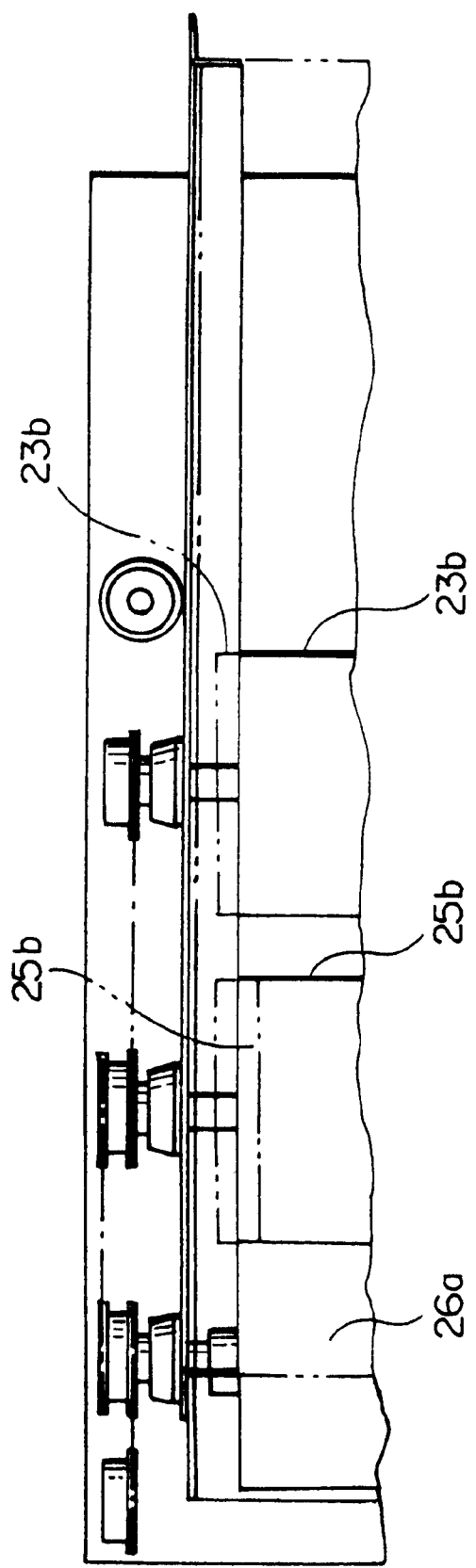
FIG. 18 is a plan view showing a swinging state of the embodiment.

With such a constitution, the first and second squeezing rollers 23 and 25 are swung left and right alternately in the axial direction. By employing such an alternate swinging method, horizontal swinging is prevented (FIG. 18).

Figure 17:
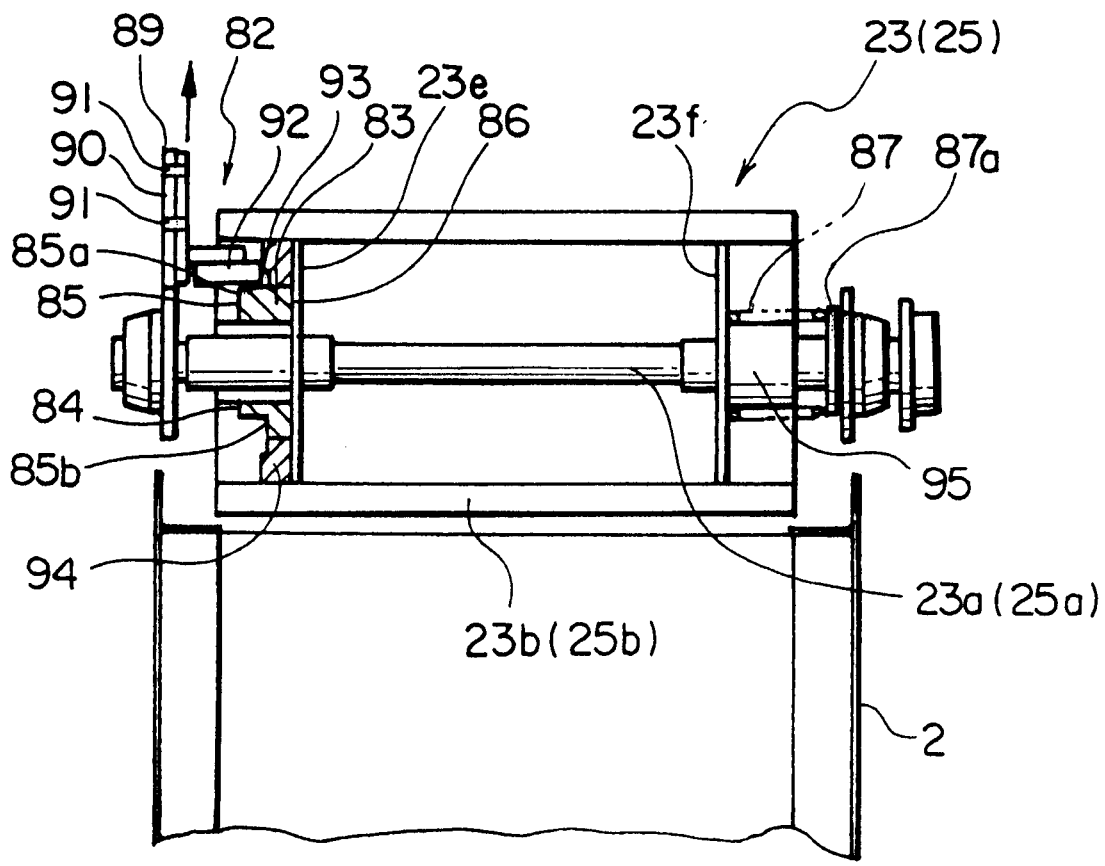
FIG. 17 is a sectional view of the swinging mechanism of the embodiment, showing a neutral state.

In addition, to employ the mode of not swinging the first and second squeezing rollers 23 and 25 unlike the foregoing, the bolt 91 fastened and fixed to the oblong hole 90 of the support plate 89 may be loosened to move the bearing unit 88 upward, and switching may be made to release a contact state between the follower roller 92 and the cam sliding surface 85 of the disk cam 83 (neutral state shown in FIG. 17). In this case, since the roller main body 23b (25b) is always pressed in the axial direction by the spring 87, the peripheral surface 93 of the follower roller 92 is slid into contact with the side face of a neutral disk 94 provided in the roller main body side face 23e (25e) more outside in a diameter direction than the disk cam 83. Thus, each of the rollers 23 and 25 is only rotated.

In the above-described embodiment, the first and second squeezing rollers 23 and 25 are both provided with the swinging mechanism 82 and 82. However, either one of the squeezing rollers may be provided with a swinging mechanism, the first to third squeezing rollers 23 to 26 may all be provided with swinging mechanisms 82, and one or a plurality of squeezing rollers can be selected and provided according to the embodiment within the scope of the present invention.

The driving source 28 is a motor disposed inside or outside the apparatus casing 1. The motor 28 transmits rotation on a belt 32 through the transmission pulley 29 of the motor 28 and a driving pulley 31 provided in a rotary net driving shaft 30. The shaft 30 includes transmission rollers 33 and 33 for transmitting rotation, provided with a desired gap in a coaxial manner. One rotary-driven transmission roller 33 transmits rotation to an opposite transmission roller 36 by a belt 35. The roller 36 transmits rotation through a shaft 38 to one coaxial transmission roller 36.

The rotary net 2 is placed on the rotational motion transmission rollers 33, 33, 36 and 36 disposed to be rotatable, the guiding pieces 17 and 17 of the rotary net 2 are inserted into and held in holding grooves 34, 34, 37 and 37 respectively provided in the rollers 33, 33, 36 and 36, and the rotary net 2 receives rotation transmitted from the rollers 33, 33, 36 and 36 to be rotated. In the drawing, a reference numeral 81 denotes a tension roller for tensing the belt 35 laid between the rotational motion transmission rollers 33 and 36.

The rotary net driving shaft 30 is provided with a rotational motion transmission pulley 39. The transmission pulley 39 transmits rotation through a belt 40 to the pulley 42 of a tension shaft 41. A pulley 43 adjacent to the pulley 42 through the shaft 41 transmits the rotation to the pulley 45 of a squeezing roller driving shaft 44 by a belt 47, and the squeezing roller 21 is rotated simultaneously with the rotation of the rotary net 2.

Then, a pulley 46 adjacent in a coaxial manner to the pulley 45 of the squeezing roller driving shaft 44, to which the rotation movement has been transmitted, transmits the rotation to the pulley 26c of the third squeezing roller 26 provided in the downstream side by a belt 48. A pulley 26d adjacent in a coaxial manner to the pulley 26c of the third squeezing roller 26, to which the transmission has been transmitted, transmits the rotation to the pulley 25c of the second squeezing roller 25 in the upstream side. Then, a pulley 25d adjacent in a coaxial manner to the pulley 25c of the second squeezing roller 25 transmits the rotation to the pulley 23c of the first squeezing roller 23 provided in the most upstream side.

In the embodiment, the rotation of the rotary net 2, and the rotation of each of the squeezing rollers 23, 25 and 26 are carried out by the single driving source 28, thereby contributing to space saving and cost reduction. However, there is no particular limitation placed in this regard. For example, the rotary net 2 and the squeezing rollers 23, 25 and 26 may be rotary-driven respectively by different driving sources. In addition, the squeezing rollers 23, 25 and 26 may be rotary-driven by different driving sources, and changes and settings can be made optionally within the scope of the invention.

In addition, the structure for transmitting rotation to the rotary net 2 and the squeezing rollers 23, 25 and 26 is not limited to that of the embodiment, and changes can be made optionally within the scope of the invention. Especially, for the rotary net 2, the structure of transmitting rotation from the outside of the rotary net 2 without providing the rotary shaft therein is preferable, and a structure can be optionally selected within the scope of the invention.

The roe particles scraper portion 51 operates to scratch off roe particles $E_1$ pressed with the peripheral surface 3 by the squeezing rollers 23, 25 and 26, and drooped through the roe particles dropping holes 6 into the rotary net 2, and separate and drop the roe particles into the cylinder.

Specifically, inside the rotary net 2, first, second and third scraper portions 52, 60 and 65 are provided respectively below all of the first to third rollers 23 to 26 in the axial direction of the rotary net 2. The number of roe particles scraper portions 51 can be selected, e.g., one or a plurality, and thus there is no particular limitation placed in this regard.

The first scraper portion includes: a scraper 53 slid into contact with the peripheral inner surface 3b of the rotary net 2; left and right arm plates 54 and 54 for fixing the lower end sides of both ends of the longitudinal direction of the scraper 53; a shaft 56; and scraper shaft fixing brackets 57 and 57 for respectively fixing both ends of the shaft 56.

The scraper 53 is formed in a long rod shape by using a resin material to have a length roughly equal to the axial direction length of the peripheral surface 3 of the rotary net 2, and the top surface 53a thereof is formed in a slope shape from the upstream side to the downstream side when seen from the rotational direction of the rotary net 2. The entire scraper 53 is attached to the tips of the arm plates 54 and 54 by a desired slope angle, and the top surface 53a is slid into contact with the peripheral inner surface 3b of the rotary net 2.

According to the embodiment, the slope angle of the scraper top surface 53a is set equal to about 500. The entire scraper 53 is attached to the tips of the arm plates 54 and 54 in such a way as to freely adjust the slope angle, and the top surface 53a is slid into contact with the peripheral inner surface 3b. An attaching slope angle in the initial stage thereof is set equal to 117.38°.

The constitution with the foregoing slope angle is designed to effectively deal with the wear of the scraper 53. Specifically, since the scraper 53 is always slid into contact with the peripheral surface, the top surface 53a may be worn depending of the frequency of use. In this case, if wear progresses, the peripheral surface 3 and the scraper top surface 53a may be separated from each other, reducing the scraping effect.

In the embodiment, the tip of the scraper top surface 53a is lowered by the slope angle of about 65°. Accordingly, tip biting-in is prevented.

Thus, according to the embodiment, in the initial stage, the top surface of the scraper 53 is formed in a slope shape as described above, and the scraper top surface 53a is slid into contact with the peripheral inner surface 3b by attaching it beforehand with a desired slope angle. If the top surface 53a is worn by the frequency of use, and separated from the peripheral surface 3, the slope state of the entire scraper 53 attached to the tip of the arm plate 54 so as to freely change the angle is raised (raised toward the downstream side when seen from the rotational direction of the rotary net 2). Accordingly, the scraper top surface 53a is always slid into contact with the peripheral inner surface 3b, making it possible to maintain the scraping effect.

As a result, scraper 53 can be effectively used within its usable range, and costs can be greatly reduced compared with a case where the scraper is replaced by a new one every time. Instead of the constitution of the embodiment, the scraper may be attached to the tip of the arm plate without any slopes, and the scraper is replaced by a new one each time it is worn. This arrangement is also within the scope of the invention, and in no way interferes with the execution of the invention.

The second and third scraper portions 60 and 65 employ the same constitutions as that for the first scraper portion 52. Thus, similar portions are denoted by similar reference numerals, and description thereof will be omitted. In the drawings, reference numerals 61 and 66 denote scrapers; 61a and 66a top surfaces; 61b and 66b upstream edge portions; 62, 62, 67 and 67 arm plates; 63 and 68 long holes; and 64 and 69 shafts.

According to the embodiment, the scraper upstream edge portions 53b, 61b and 66b of the first to third scraper portions 52, 60 and 65 are provided not directly below the axial centers 27 of the opposite squeezing rollers 23, 25 and 26 but in positions slight shifted (shifted by width indicated by 58 in the drawing) downstream from the axial centers 27. In this way, scraping performance is improved.

In the embodiment, only one bracket 57 is fixed to the apparatus casing 1, while the other bracket 57 is not fixed, but locked and held in a stay projected in a horizontal direction, now shown. Accordingly, during the attaching/detaching of the rotary net 2, the entire roe particles scraper portion 51 can be pulled out from the rotary net 2.

In the drawings, a reference numeral 59 denotes a fine adjustment roller for fine-adjusting the contact of each of the scrapers 53, 61 and 66 into the peripheral inner surface 3b. The fine adjustment roller 59 is a freely rotatable roller having a desired diameter, adapted to be movable to each of the long holes 55, 63 and 68 provided in the arm plates 54, 62 and 67, and held in a predetermined position.

A position is adjusted in the longitudinal direction of each of the arm plates 54, 62 and 67, the outer periphery of the roller 59 is brought into contact with the rotary net 2, and then fine adjustment is made in contact with each of the scrapers 53, 61 and 66. Thus, smooth contact is always achieved.

In the drawings, reference numerals 70, 71 and 72 respectively denote roller side first, second and third scrapers provided in the squeezing rollers 23, 25 and 26 sides. The roller side first to third scrapers 70, 71 and 72 scratch off roe particles or an ovary membrane stuck to the surface of the squeezing rollers 23, 25 and 26 during the operation of rotation and pressing, and then return the same onto the peripheral surface 3 of the rotary net 2. For example, by thin plates having lengths approximately equal to the axial lengths of the rollers 23, 25 and 26, the axial direction upper edges 70b, 71b and 72b thereof are held on shafts 70c, 71c and 72c provided between the left and right shaft fixing brackets 24 and 24 of the squeezing roller, and width direction lower edges 70a, 71a and 72a are brought into light contact with the surfaces of the squeezing rollers 23, and 26.

According to the embodiment, the roller side first scraper 70 roughly reverse V-shaped in vertical section is provided between the first squeezing roller 23 and the second squeezing roller 25, and the lower edges 70a and 70a are respectively brought into contact with the first and second squeezing rollers 23 and 25. The roller side second scraper 71 roughly reverse V-shaped in vertical section is provided between the second squeezing roller 25 and the third squeezing roller 26, and the lower edges 71a and 71 are respectively brought into contact with the second and third squeezing rollers 25 and 26. The roller side scraper 72 made of a single plate is provided in the rear side of the third squeezing roller 26, and the lower edge 72a is brought into contact with the third squeezing roller 26.

The contact of each of the roller side scrapers 70, and so on with each of the rollers 23, and so on, is adjusted to be light in such a way as to prevent interference with the rotation of each of the rollers 23, and so on.

In the drawings, a reference numeral 73 denotes a roe particles chute for receiving separated and dropped roe particles $E_1$. The roe particles chute 73 is disposed in the cylinder of the rotary net 2 in such a manner that both upper edges 73b and 73b of two wall surface plates 73a and 73a are separated from each other, the lower end edges thereof are joined to each other, the joint portion being set as a roe particles flow path 73c, and a drop opening 73d formed between the separated upper edges 73b and 73b is widened oppositely to the lower side of the scraping range of the roe particles scraper portion 51.

The roe particles chute 73 is held to be suspended in the optional place of the apparatus casing 1 in non-contact with the rotary net 2. The roe particles flow path 73c is linked in a down slope shape toward a separated roe particles discharging chute 74 provided oppositely to one side face 9 of the rotary net 2.

Thus, the roe particles $E_1$ scratched-off and dropped by the roe particles scraper portion 51 are dropped onto the roe particles chute 73, collected in the roe particles flow path 73c, and then sent along the flow path of the down slope shape to the separated roe particles discharging chute 74 of the downstream side.

In addition, according to the embodiment, each of the wall surface plates 73a and 73a constituting the roe particles chute 73 is formed in a meshed shape having a desired hole diameter. Only the separated and dropped roe particles $E_1$ are received by the chute 73, and those other than roe particles, e.g., juice of crushed roe particles, washing water, or the like are all dropped through the holes of the meshed shape. Accordingly, though different among roe particles and no particular limitation is placed, each of the holes 73e of the meshed shape should preferably be formed to have a small diameter enough to prevent the fitting-in of the roe particles $E_1$.

The arrangement for receiving roe particles is in no way limited to the of the roe particles chute 73 of the embodiment, and a structure can be freely selected within the scope of the invention. That is to say, the other chute structure may be employed within the scope of the invention, alternatively the cylindrical body of an open upper end may suspended simply as a roe particles receiving member in non-contact with the rotary net 2. Such a simple structure is also within the scope of the invention. In this case, a meshed structure may be employed to discharge residual wastes such as juice to the bottom surface of the cylindrical body, but no particular limitation is placed in this regard.

A reference numeral 75 denotes a residual waste receiving chute. The residual waste receiving chute 75 has a down slope structure similar to that of the roe particles chute 73, and it is arranged below the roe particles chute 73 with a gap.

Accordingly, the residual waste receiving chute 75 is structured to receive residual wastes (juice, refuse, washing water, and so on) $E_4$ dropped from each meshed portion (hole) 73e of the roe particles chute 73, and discharges them to a separately provided residual waste discharging chute 76.

Thus, for wall surface plates 75a and 75a constituting the residual waste discharging chute 75, smooth flat plates made of stainless steels are used.

The structure of the residual waste discharging chute 75 is not limited to that of the embodiment, and changes can be made optionally within the scope of the invention. In addition, this component can be omitted according to the invention, and selected as occasion demands according to the embodiment.

In the drawings, a reference numeral 77 denotes a slope-shaped ovary membrane chute for separating roe particles $E_1$, and scraping and discharging an ovary membrane $E_2$ remaining on the peripheral surface 3 of the rotary net 2 from the upper side of the peripheral surface 3. The sloped upper end 77a side thereof is set in light contact with the peripheral outer surface 3a, or very close to the same with a slight gap.

According to the embodiment, showers 79 and 80 are provided in two places to enable washing water to be jetted to the peripheral surface 3 of the rotary net 2.

One shower 79 uses the shaft 72c of the roller side third scraper 72 also as a shower nozzle, and washing water is jetted from the surface of the shaft to the peripheral outer surface. This shower 79 jets the washing water to the surface of the third squeezing roller 26, and the kicked-back washing water is dropped through a number of through-holes in the outer surface of the peripheral surface 3. The other one is a shower nozzle disposed in the cylindrical body of the rotary net 2 in the axial direction more downstream then the shower 79, and jets the washing water to the peripheral inner surface.

Thus, by jetting the washing water from the inside or outside of the peripheral surface 3 to the residual ovary membrane $E_2$, the residual ovary membrane $E_2$ is floated from the peripheral outer surface 3a or dropped onto the ovary membrane chute 77. As a result, it is possible to improve the effect of ovary membrane scraping by the ovary membrane chute upper end 77a.

The foregoing ovary membrane chute structure is not limited to the illustrated example, and can be changed optionally within the scope of the invention.

The control unit 78 performs control within the scope of the invention in order to adjust, for example the speed of the rotary net 2/the squeezing rollers 21.

A control target is not limited to the foregoing, and can be properly selected within the scope the invention.

Moreover, the place of disposing the control unit 78 is optional, and a place to be easily adjusted by the worker, e.g., the side face of the apparatus casing 1, is selected and then the control unit 78 is attached thereto.

Next, the use state of the embodiment will be described.

First, the operation switch of the in control unit 78 is turned ON, and the first to third squeezing rollers 23, 25 and 26 are respectively rotated. The rotational speed of the rotary net 2 is in no way limited, and can be varied and set properly within the scope of the invention. In the embodiment, a rotational speed thereof is set equal to 3.8 revolution/min. (peripheral speed 12M/min.)–50 Hz.

Then, the desired number of roes E (salmon eggs, trout eggs or the like) with an ovary membrane, one surface of the ovary membrane $E_2$ having been cut, is stored on the stocker 18, then the cur surface is placed oppositely to the peripheral outer surface of the rotary net 2, and the roes E with the ovary membrane are sequentially loaded on the peripheral outer surface 3a.

Figure 9:
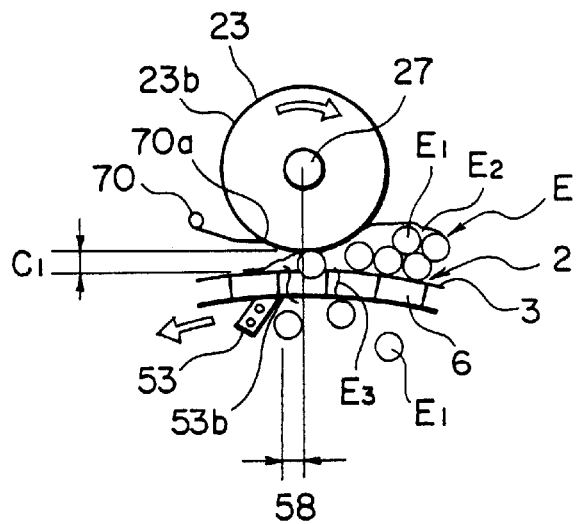
FIG. 9 is a vertical section side view partially showing a roe particles scraping state by a first squeezing roller and a first scraper portion.

As described above, the roes E with the ovary membrane loaded on the peripheral outer surface 3a of the rotary net 2 are sent to the downstream die of a rotational direction downstream by the rotation of the rotary net 2, and first enters between the first squeezing roller 23 and the peripheral outer surface 3a of the rotary net 2 (see FIG. 9).

Here, the roes E with the ovary membrane are pressed from the above by the first squeezing roller 23 with desired pressure. The pressed roes E are forcibly dropped through the roe particles dropping holes 6 of the peripheral surface 3 of the rotary net 2 into the rotary net 2, and then collected on the roe particles chute 73 disposed below.

There may be roe particles $E_1$ suspended inward from the roe particles dropping holes 6 of the peripheral surface 3 of the rotary net 2 because of a stuck line $E_3$ or the like.

However, by cutting the line $E_3$ with the scraper 53 of the first scraper portion 52, only the roe particles $E_1$ are scratched off and dropped. The roe particles $E_1$ dropped on the roe particles chute 73 are then sent from the slope-shaped roe particles flow path 73c of the chute 73 to the separated roe particles discharging chute 74.

By the pressing operation of the first squeezing roller 23 and the line cutting operation of the first scraper portion 52, most of the roe particles $E_1$ are separated from the ovary membrane $E_2$.

Figure 10:
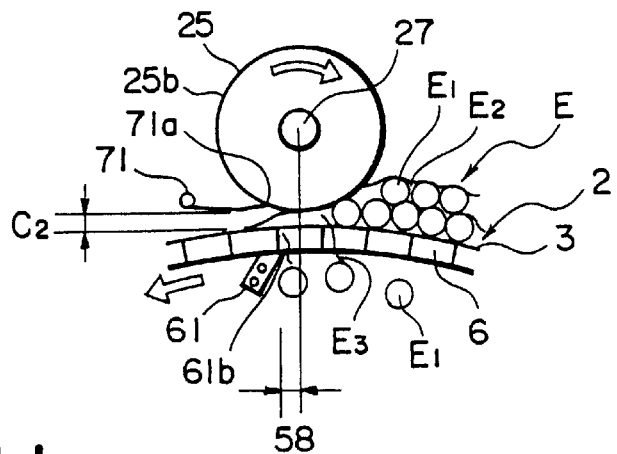
FIG. 10 is a vertical section side view partially showing a roe particles scraping state by a second squeezing roller and a second scraper portion.

Subsequently, the roe particles $E_1$ that have not been separated by the first squeezing roller 23 and the roller side first scraper 70, for example roe particles $E_1$ smaller in diameter than the gap $C_1$ between the first squeezing roller 25 and the roller side second scraper 71, are sent further to the downstream side of the rotational direction on the peripheral surface 3 by the rotation of the same, and subjected to a separation operation by the first squeezing roller 23 and the roller side second scraper 71 (see FIG. 10). That is to say, by the second squeezing roller 25 having a gap $C_2$ with peripheral outer surface 3a set narrower than that of the first squeezing roller 23, the roes E having entered below the roller 25 are pressed from the above, and forcibly dropped through the roe particles dropping holes 6 of the peripheral surface 3 of the rotary net.

In this case, there are roe particles $E_1$ suspended inside the rotary net 2 because of the line $E_3$. However, similarly to the foregoing scraping operation by the roller side scraper 70, the line is cut by the scraping operation of the roller side second scraper 71, and thereby the roe particles are dropped.

Then, the roe particles $E_1$ dropped on the roe particles chute 73 are sent from the slope-shaped roe particles flow path 73c of the chute 73 to the separated roe particles discharging chute 74.

The roe particles E1 that have not been separated by the second squeezing roller 25 and the roller side second scraper 71 are sent further to the downstream side of the rotational direction on the peripheral surface 3 by the rotation of the rotary net 2, and then subjected to a separation operation by the third squeezing roller 26 and the roller side third scraper 72.

Figure 11:
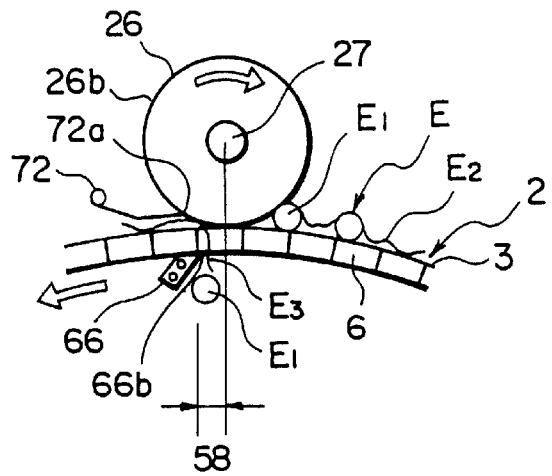
FIG. 11 is a vertical section side view partially showing a roe particles scraping state by a third squeezing roller and a third scraper portion.
Figure 12:
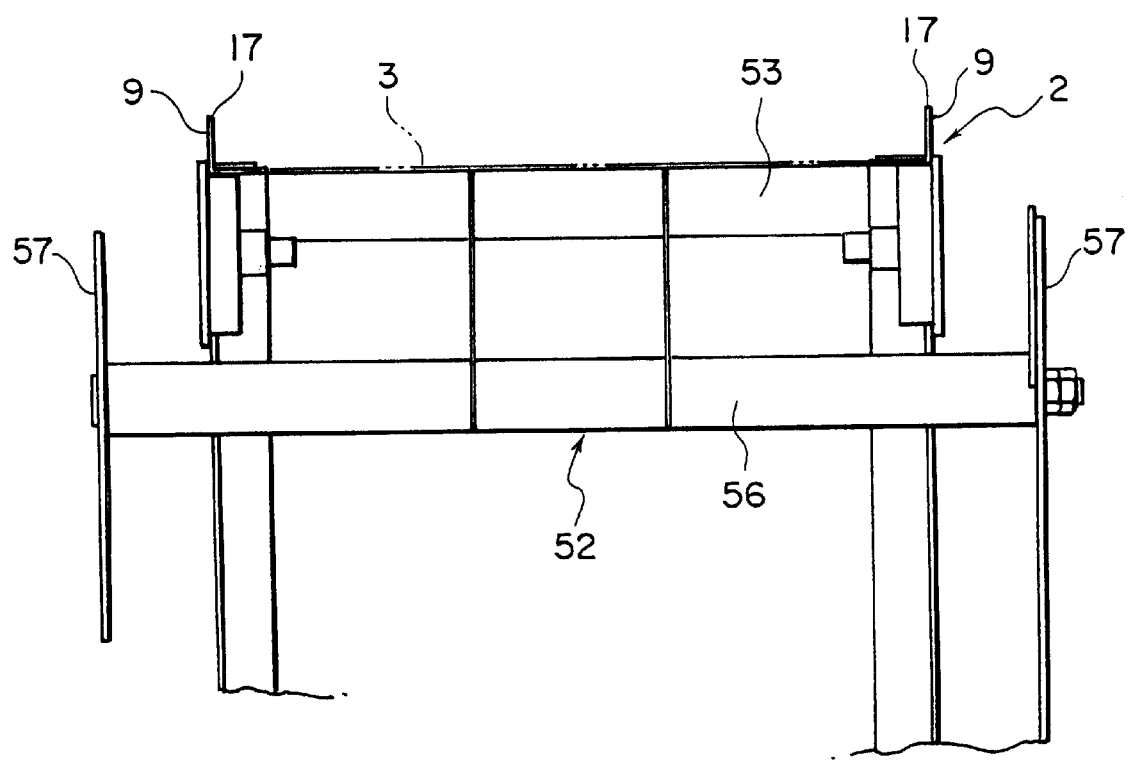
FIG. 12 is a front view of a roe particles scraper portion.
Figure 13:
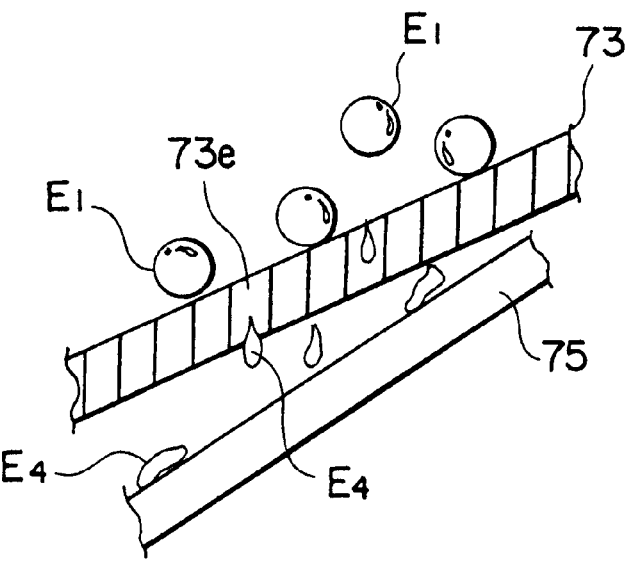
FIG. 13 is a vertical sectional view showing in expansion a roe particles chute and a residual waste receiving chute.
Figure 14:
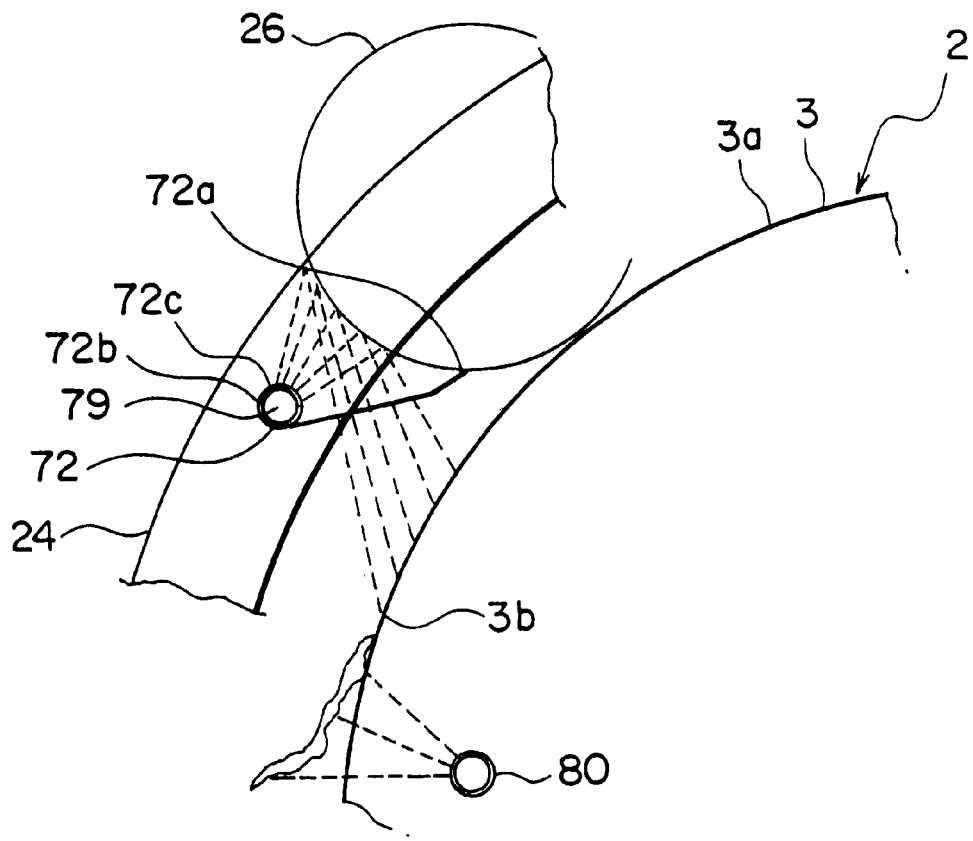
FIG. 14 is a schematic view showing in expansion a shower disposing portion.

Specifically, by the third squeezing roller 26 having a gap with the peripheral surface 3 set narrower than that of the second squeezing roller 25, brought into light contact with the peripheral outer surface 3a in the embodiment, the roes E having entered below the squeezing roller 26 are pressed from the above, and forcibly dropped through the roe particles dropping holes 6 of the peripheral surface 3 of the rotary net (see FIG. 11).

Also in this case, there may be roe particles suspended inside the rotary net because of the line $E_3$. However, similarly to the foregoing scraping operation by the roller side first and second scrapers 70 and 71, the line $E_3$ is cut by the roller side third scraper 72, and the roe particles are scratched off.

The roe particles $E_1$ dropped on the roe particles chute 73 are sent from the slope-shaped roe particles flow path 73c of the chute 73 to the separated roe particles discharging chute 74.

Then, for the roes E with the ovary membrane that have been subjected to the separation operation by the first to third squeezing rollers 23 to 26 and the roller side first to third scrapers 70 to 72, all the roe particles $E_1$ are separated from the ovary membrane $E_2$, and dropped from the upper side of the peripheral outer surface 3a onto the roe particles chute 73, leaving only the ovary membrane $E_2$ after the roe particles separation on the peripheral outer surface 3a.

According to the embodiment, since the constitution is employed, where the gaps $C_1$, $C_2$, and so on with the peripheral surface 3 are gradually narrowed from the first squeezing roller 23 to the third squeezing roller 26, the following special advantages are provided.

In the case of the roes (salmon roes) E with the ovary membrane of the initial stage, entering the gap $C_1$ with the first squeezing roller 23, some roe particles $E_1$ naturally drop during loading (because of the hand-pressing by the worker during loading on the peripheral surface 3, but still many roe particles $E_1$ are enveloped and the membrane having the roe particles are thick as a whole. However, since the gap $C_1$ with the first squeezing roller 23 is one for enabling easy pressing by the roller 23, there is no possibility of crushing the roe particles $E_1$.

As described above, a considerable number of roe particles $E_1$ are separated and dropped by the first squeezing roller 23 and the roller side first scraper 70, and the roes (salmon roes) E with the ovary membrane sent downstream are thin as a whole. Thus, since the gap $C_2$ between the second squeezing roller 25 and the peripheral surface 3 is narrowed more than the gap $C_1$, the roes E with the ovary membrane, thin in form, can be easily pressed. Moreover, since most of the roe particles $E_1$ are separated and dropped by the first and second squeezing rollers 23 and 25 and the roller side first and second scrapers 70 and 71, and the roes (salmon roes) E with the ovary membrane sent to the third squeezing roller 26 are in a state where only a few roe particles $E_1$ are stuck to the ovary membrane $E_2$, then problem of crushing the roe particles can be prevented even if the gap with the peripheral surface 3 is narrowed much more than that of the second squeezing roller 25.

The ovary membrane E2 remaining on the peripheral outer surface 3a is scratched off from the peripheral outer surface 3a by the upper end 77a of the ovary membrane chute 77, and dropped and discharged along the slope of the chute 77.

According to the embodiment, the shaft 72c of the roller side third scraper 72 is also used as a nozzle for the shower 79, washing water is jetted from the shower 79 to the surface of the third squeezing roller 26, and the washing water is jetted to the peripheral inner surface 3b by the shower nozzle 80 disposed in the cylinder of the rotary net in the axial direction more downstream than the shower 79. Thus, the work of scraping the ovary membrane is further improved.

The washing water and the juice or the like of the crushed roe particles are collected in the residual waste receiving chute 75 dispose below the roe particles chute 73, and then discharged.

In this case, since the juice or the like of the crushed roe particles is dropped through the holes 73e of the roe particles chute 73 to the residual waste receiving chute 75, only the separated roe particles $E_1$ are collected in the roe particles chute 73. Thus, since the juice or the like of the crushed roe particles can be automatically separated from the separated roe particles E1, time and labor (time and labor of washing roe particles E1 or the like) thereafter can be greatly reduced.

Next, the method of attaching/detaching the rotary net will be described.

First, the operation switch of the control unit 78 is turned OFF, and the operations of the rotary net 2 and the first to third squeezing rollers 23 to 26 are stopped. The roller group 22 including the first to third squeezing rollers 23 to 26, and the stocker 18 are reversed out of the rotational operation range of the rotary net 2, setting a state where no members for contact are present on the peripheral surface 3 of the rotary net. In the case of the rotary net 2, since no particular structure, such as supporting, is not employed, in this state, only the left and right guiding pieces 17 and 17 are partially held and loaded on the front and back and left and right rotational motion transmission rollers 33, 33, 36 and 36. Accordingly, by lifting up the rotary net 2 when such a state is set, the held guiding pieces 17 and 17 of the rotary net 2 are disengaged from the rollers 33, 33, 36 and 36, making it possible to easily pull out the entire rotary net 2 upward.

In this case, in order to avoid the roe particles scraper portion 51, the rotary net lifted up and disengaged from the rollers 33, 33, 36 and 36 are shifted sideways, and moved away from the roe particles scraper portion 51.

Thus, according to the embodiment, since the rotary net 2 can be easily separated from the apparatus casing 1, high convenience and workability can be provided for washing or repairing the rotary net 2, and working hours can be greatly reduced.

The loading of the rotary net 2 is facilitated by performing a work process reverse to the foregoing removing process.

Because of the foregoing constitution, the present invention can provide the continuous roe separating apparatus, which is capable of performing continuous roe particles separation work, suitable for mass production, and capable of easily and surely carrying out the work of separating roe particles without troubling worker's hands.

That is to say, all of the problems inherent in the conventional art can be solved. The problems were (1) the separation work of next roes cannot be started before the completion of the separation work of roes with an ovary membrane set by one work, (2) the pressing device must be moved up and down for operation for each work, and (3) the work must be interrupted to raise the pressing device in order to confirm the clear separation and dropping of roes from the ovary membrane.

Accordingly, the loss of working hours that have conventionally been requested to be quickly solved can be reduced, and as a result, it is possible to achieve mass production.

In addition, since the worker only needs to enter roes with an ovary membrane, compared with the conventional art, the waste or labor can be greatly reduced, work selection is facilitated because skilled works needed in the manual work are not required, and compliance with HACCP for hygiene management can be sufficiently improved.

The rotary net can be easily separated and removed thus making washing and cleaning quite easy.

Furthermore, the roes with an ovary membrane are loaded on the peripheral surface of the cylindrical rotary net, an axial center thereof being set horizontal, and the roes are sequentially loaded by the rotation of the rotary net. Therefore, the entire apparatus can be made compact, and it is possible to separate and process a great deal of roes with an ovary membrane while saving space.

What is claimed is:

1. A continuous roe separating apparatus comprising,
a cylindrical rotary net having a meshed peripheral surface defining roe particle dropping holes sized to receive and pass roe particles therethrough and mounted such that its central axis is horizontal, said net being rotatable about its central axis, said meshed peripheral surface defined to receive and carry an ovary membrane with roe particles therewithin and having at least one open surface toward a squeezing roller assembly;

a squeezing roller assembly mounted adjacent said cylindrical rotary net and comprising a plurality of rollers rotatable about roller axes substantially parallel to said rotary net central axis, and each rotatable in a rotary direction opposite to the rotation of said cylindrical rotary net, the first of said rollers spaced from the meshed peripheral surface to form a first gap therebetween, an adjacent second roller downstream from said first of said rollers spaced from the meshed peripheral surface to form a second gap therebetween, said second gap less than said first gap, and any additional roller downstream from said second roller being spaced from the meshed peripheral surface a gap distance less than the gap distance of the adjacent upstream roller, said plurality of rollers pressing the ovary membrane against the meshed peripheral surface to squeeze out the roe particles from the ovary membrane through the roe particle dropping holes in a direction into the interior of the cylindrical rotary net; and a roe particle scraper assembly positioned within the interior of the cylindrical rotary net adjacent the meshed peripheral surface and including a scraper for scraping off roe particles that are pressed and drooped through the roe particle dropping holes so as to fall within the interior of the cylindrical rotary net.

2. The continuous roe separating apparatus of claim 1 wherein said meshed peripheral surface is a steel net.

3. The continuous roe separating apparatus of claim 2 wherein said steel net comprises a first group of parallel stainless steel wires and a second group of parallel stainless steel wires welded to the first group at an angle with respect to the first group so as to form the roe particle dropping holes.

4. The continuous roe separating apparatus of claim 1 wherein said roe particle scraper assembly comprises a plurality of scrapers equal in number to the number of rollers of said squeezing roller assembly, each scraper positioned within the rotary net interior and under a roller.

5. The continuous roe separating apparatus of claim 4 wherein each scraper includes a scraper portion in contact with an interior of the meshed peripheral surface to scrape off the roe particles that droop from the peripheral surface.

6. The continuous roe separating apparatus of claim 1 wherein said cylindrical rotary net is rotatably driven by a plurality of transmission rollers, and a drive source for rotating the transmission rollers to rotate the cylindrical rotary net.

7. The continuous roe separating apparatus of claim 6 wherein said cylindrical rotary net includes a pair of annular guide piece discs, said transmission rollers including a groove to receive and rotate said discs.

8. The continuous roe separating apparatus of claim 1 further comprising a swinging mechanism for moving the rollers of said squeezing roller assembly in directions along their axes simultaneously with rotary motion.

* * * * *